United States Patent
Votteler et al.

(10) Patent No.: US 12,341,174 B2
(45) Date of Patent: Jun. 24, 2025

(54) ELECTRIC BATTERY AND MOTOR VEHICLE

(71) Applicant: Mahle International GmbH, Stuttgart (DE)

(72) Inventors: Georg Votteler, Backnang (DE); Johannes Weinmann, Stuttgart (DE)

(73) Assignee: Mahle International GmbH (DE)

( * ) Notice: Subject to any disclaimer, the term of this patent is extended or adjusted under 35 U.S.C. 154(b) by 465 days.

(21) Appl. No.: 17/681,771

(22) Filed: Feb. 26, 2022

(65) Prior Publication Data

US 2022/0278388 A1  Sep. 1, 2022

(30) Foreign Application Priority Data

Feb. 26, 2021 (DE) .......................... 102021201841.6
Apr. 21, 2021 (DE) ...................... 10 2021 203 978.2

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/625* (2015.04);
(Continued)

(58) Field of Classification Search
CPC ............ H01M 50/244; H01M 50/271; H01M 10/6556
See application file for complete search history.

(56) References Cited

U.S. PATENT DOCUMENTS

| 7,094,496 | B2 | 8/2006 | Rodriguez |
| 7,744,405 | B2 | 6/2010 | Suzuki |

(Continued)

FOREIGN PATENT DOCUMENTS

| CN | 111009623 A | 4/2020 |
| DE | 10 2017 206 564 A1 | 10/2018 |

(Continued)

OTHER PUBLICATIONS

German Search Report for DE-102021203978.2, dated Dec. 9, 2021.
Chinese Notice of First Examination Opinion dated Feb. 1, 2024 for Chinese Patent Application No. 202210178862.8.

*Primary Examiner* — Stewart A Fraser
*Assistant Examiner* — Lilia Nedialkova
(74) *Attorney, Agent, or Firm* — Fishman Stewart PLLC

(57) ABSTRACT

An electric battery may include a battery housing, a plurality of battery cell modules, an electrical current conduction, and a cover. The battery housing may include a plurality of housing cut-outs that are sealed via a cooling plate. The battery cell modules may be configured to store electric energy and may be thermally connected to the cooling plate. Each of the battery cell modules may include an electrical positive connection and an electrical negative connection. The electrical current conduction may be configured to supply the battery cell modules electric energy. The electrical current conduction may include a first electrical conductor rail and a second electrical conductor rail. The cover may be detachably coupled to the battery housing. The first conductor rail may include a plurality of rail elements. One of the rail elements may be configured to electrically connect adjacent battery cell modules.

20 Claims, 5 Drawing Sheets

(51) Int. Cl.
  *H01M 10/625* (2014.01)
  *H01M 10/653* (2014.01)
  *H01M 10/6556* (2014.01)
  *H01M 50/262* (2021.01)

(52) U.S. Cl.
  CPC ..... *H01M 10/653* (2015.04); *H01M 10/6556* (2015.04); *H01M 50/262* (2021.01); *H01M 2220/20* (2013.01)

(56) References Cited

U.S. PATENT DOCUMENTS

| | | |
|---|---|---|
| 10,833,348 B2 | 11/2020 | Wolpert |
| 10,944,136 B2 | 3/2021 | Kustosch |
| 11,233,284 B2 | 1/2022 | Geskes |
| 2018/0109016 A1* | 4/2018 | Fees .................... H01R 11/281 |
| 2020/0020914 A1 | 1/2020 | Fukushima et al. |
| 2020/0112072 A1 | 4/2020 | Schmitt |
| 2020/0180442 A1 | 6/2020 | Rabe et al. |
| 2020/0198476 A1 | 6/2020 | Janzen et al. |
| 2022/0209348 A1* | 6/2022 | Lee ...................... H01M 50/24 |

FOREIGN PATENT DOCUMENTS

| | | |
|---|---|---|
| DE | 102017212223 A1 | 1/2019 |
| DE | 10 2017 217 108 A1 | 3/2019 |
| DE | 102017223215 A1 | 6/2019 |
| DE | 10 2018 217 022 A1 | 4/2020 |
| DE | 10 2018 131 374 A1 | 6/2020 |
| DE | 10 2018 222 704 A1 | 6/2020 |
| EP | 1282188 A1 | 2/2003 |
| WO | 2004021479 A1 | 3/2004 |

* cited by examiner

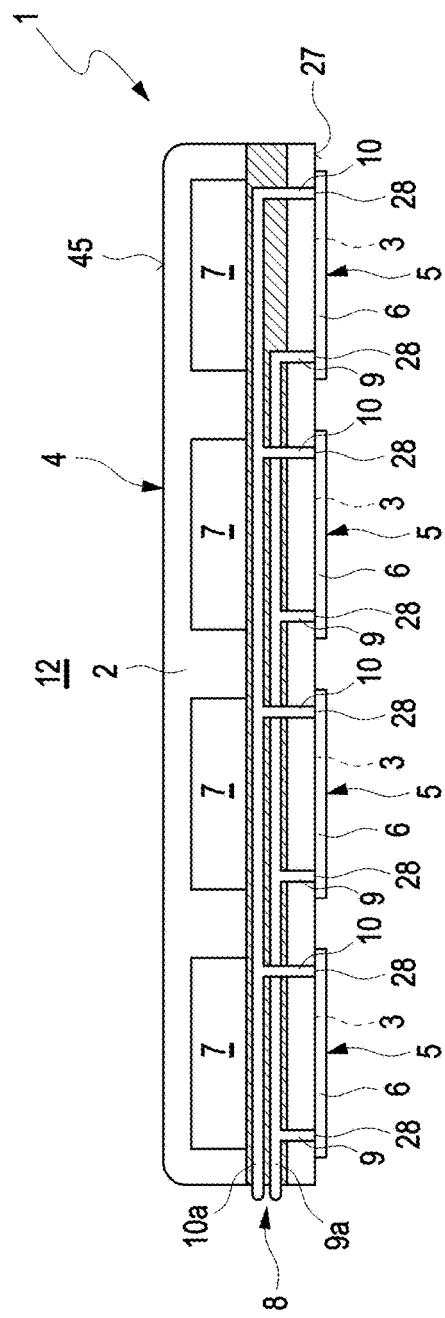

_US 12,341,174 B2_

ELECTRIC BATTERY AND MOTOR VEHICLE

CROSS-REFERENCE TO RELATED APPLICATIONS

This application claims priority to German Patent Application No. DE 102021201841.6, filed on Feb. 26, 2021, and German Patent Application No. DE 102021203978.2, filed on Apr. 21, 2021, the contents of which are hereby incorporated by reference in their entirety.

TECHNICAL FIELD

The invention related to an electric batter and to a motor vehicle, in particular to an electric vehicle having a purely electric drive.

BACKGROUND

For some time, electric batteries for motor vehicles have been realised in modular form having multiple battery cell modules which are arranged in a common battery housing. The individual battery cell modules are electrically connected in series or parallel and led to the outside by means of an electrical current conduction so that the battery cell modules outside the battery cell housing can be connected to an electrical consumer—in the case of an electric vehicle with an electric drive—and supply the same with the electric energy stored in the battery cell modules.

Often, the configuration and also the mounting of the said electric current conduction during the course of the assembly of the electric battery prove to be problematic.

SUMMARY

It is therefore an object of the present invention to show new ways in the development of electric batteries having multiple electric battery modules and having an electrical current conduction by means of which the individual electric battery cell modules can be electrically led out of the housing interior. In particular, an electric battery having an electrical current conduction is to be created that is easy to mount yet meets high safety requirements which means in particular that current-conducting parts of the current conduction which are arranged outside the battery housing must not be exposed.

This object is solved through the subject of the independent patent claims. Preferred embodiments are subject of the dependent patent claims.

Accordingly, the basic idea of the invention is to realise an electrical current conduction for supplying a battery cell module arranged in a battery housing by means of two electrical conductor rails which are partially arranged outside on the battery housing.

It is substantial for the invention that a cover of an electrically insulating plastic formed separately from the battery housing that can be fastened to the same is included which, in a mounted state on the battery housing, covers the two electrical conductor rails outside the battery housing.

The cover formed separately from the battery housing allows initially preassembling a first one of the two conductor rails on the battery cell modules already arranged in the battery housing in order to connect these electrically in series or in parallel, and to initially mount a second one of the conductor rails, which typically assumes the function of an electrical earth line, on the cover. The cover with the second conductor rail is mounted as a unit on the battery housing only thereafter.

Following the mounting of the cover with the second conductor rail on the battery housing, the cover also covers the first conductor rail so that the electrically conductive conductor rails are completely covered and are not exposed. The result is that a simple mounting of the electrical conductor rails on the battery housing is possible.

An electric battery according to the invention includes a battery housing of an electrically insulating plastic which partially surrounds a housing interior and comprises at least one, preferentially multiple housing cut-out(s), wherein each housing cut-out is sealed by means of a plate, in particular a cooling plate, or by means of a simple end cover. When designed as a cooling plate, a coolant path that can be flowed through by a coolant can be optionally formed in the same, which extends from a path inlet to a path outlet. Further, the battery cell includes at least one battery cell module arranged in the housing interior for storing electric energy. Preferably, two or more such battery cell modules can be arranged in the housing interior. Here, each battery cell module present is thermally coupled to one of the plates. Practically, for each battery cell module arranged in the housing interior a plate for cooling the battery cell module and a housing cut-out, via which the battery cell module can be introduced into the housing interior can be provided. Here, each battery cell module present includes an electrical positive connection and an electrical negative connection.

Further, the battery includes an electrical current conduction for supplying the battery cell modules arranged in the housing interior with electric energy or for providing the energy stored in the battery cell modules. The electrical current conduction includes a first electrical conductor rail and a second electrical conductor rail, each of an electrically conductive material, which are both arranged outside on the battery housing. The first conductor rail includes multiple rail elements, by means of which a positive connection and a negative connection each of adjacent battery cell modules in the housing interior are electrically connected to one another. The second electrical conductor rail functioning as earth line is electrically connected to the negative connection of one of the battery cell modules. For each battery cell module, at least one cut-out is formed in the battery housing, through which in each case a rail element of the first conductor rail electrically connecting the two adjacent battery cell modules is passed. According to the invention, the battery includes a cover that is formed separately from the battery housing and a cover that can be—detachably or non-detachably—fastened to the same of an electrically insulating plastic, which covers the two conductor rails in the region outside the housing interior.

According to an advantageous further development, the cover is formed U-shaped in profile with a U-base and two U-legs, wherein on the two U-legs a clamping structure for fixing the cover to the battery housing is present. By means of the clamping structure, the cover can be easily yet reliably fixed to the battery housing. A cover configured such can be additionally produced easily and is thus accompanied by low manufacturing costs.

According to a further advantageous further development, a separating element of an electrically insulating plastic can be moulded on the cover, in particular on the U-base of the same. Practically, the separating element and the cover are formed in one piece and material-uniformly. The said separating element can subdivide the interior space delimited by the cover and the battery housing into a first compartment, in which—in the assembled state of the battery—the first conductor rail is received, and into a second compartment, in which the second conductor rail is received. In this way, a spatial electrical separation of the two electrical conductor rails from one another is ensure as a result of which in particular an undesirable electrical short circuit between the two electrical conductor rails, even in the case of shocks and the like, which in the absence of the separating element, could lead to a brief contact of the two conductor rails, is avoided.

Particularly preferably, the separating element can comprise a first element portion, which by means of a film hinge is hinged to a second element portion of the separating element. In this variant, the first element portion is firmly connected to the U-base, in particular integrally moulded on the same, whereas the second element portion can be or is detachably fastened to the U-base. With a separating element configured in such a manner, the second conductor rail can be easily preassembled initially in the second compartment. Following this, the cover with the preassembled second conductor rail can be fastened to the battery housing with the first conductor rail preassembled there. By means of the film hinge, the separating element, following the arranging of the second conductor rail on the cover, can be folded over and the second element portion fastened to the U-base by means of a clip-on connection or snap-on connection.

This makes possible a stable fixing of the separating element on the cover or on the U-base. Preferably, following the fastening by means of the clip-on or snap-on connection, the separating element and the U-base together surround the second compartment.

Instead of a U-shaped design, the cover in the profile can also have an I-shaped design in a further variant.

In another preferred embodiment, a mechanical stiffening structure with multiple, preferentially rib-like stiffening elements can be formed on the electrical current conduction. In this way, the mechanical stiffness of the electrical current conduction and thus its resistance to external influences, in particular mechanical impacts or mechanical shocks or the like can be increased.

Practically, the electrical current conduction can be arranged on a side of the battery housing located opposite the coolant supply and discharge. This measure simplifies both the mounting of the coolant supply and discharge as well as of the electrical current conduction on the battery housing. Apart from this, a strict spatial separation of current-conducting and fluid-conducting components is achieved in this manner.

Particularly practically, the cover is an extruded part or a plastic injection moulded part. A cover configured in such a manner can be produced particularly cost-effectively.

According to an advantageous further development, the battery housing is arranged with an underside comprising the housing cut-outs on a frame-like crash structure, preferentially of metal. In this way, the mechanical strength of the entire battery relative to external mechanical effects such as impacts or shocks, in particular when the battery is employed in a motor vehicle, is improved. Undesirable damage to the battery due to impacts or shocks can thus be counteracted.

If the plate is formed as a cooling plate with a coolant path, the battery cell can preferentially include a coolant supply and discharge provided outside on the battery housing, which fluidically communicates, separated from the housing interior, with any coolant paths that may be present. The coolant supply serves for supplying and distributing the coolant into the coolant paths formed in the plates. The coolant discharge serves for discharging and collecting the coolant having flowed through the coolant paths. To this end, the coolant supply and the coolant discharge both communicate fluidically with the coolant paths. In a preferred embodiment, the battery cell includes for each plate or cooling plate a separate sealing device. According to the invention, each sealing device is arranged between the plate or cooling plate and the battery housing so that it seals both the housing interior and also a transition from the coolant supply and discharge to the coolant path against the external surrounds of the battery housing.

In a preferred embodiment, the coolant supply and discharge includes for each plate or cooling plate a coolant supply channel fluidically communicating with the path inlet and a coolant discharge channel fluidically communicating with the path outlet. In this embodiment, all coolant supply channels communicate fluidically with a common coolant distributor channel of the coolant supply and discharge and all coolant discharge channels communicate fluidically with a common coolant collector channel of the coolant supply and discharge. This embodiment simplifies the distribution of the coolant over the individual plate or coolant plate and the collecting of the coolant having flowed through the plate or cooling plate. At least the coolant supply channels and at least the coolant discharge channels are formed at least partially by at least one recess formed outside on the battery housing, which is sealed in a fluid-tight manner by means of a cover fastened to the battery housing and preferentially formed in the manner of a tubular body. This variant can be easily realised technically and requires only little installation space.

Particularly preferably, all sealing devices introduced above are each formed in one piece. Such sealing devices are particularly simply constructed so that cost advantages for the production of the battery materialise, in particular when a large number of battery cell modules and thus sealing devices is used.

In a preferred embodiment each sealing device is arranged in the mounted state of the battery with a main portion between the plate or cooling plate and the battery housing and with two sub-portions arranged at the transition at least partially between the plate or cooling plate and the coolant supply and discharge. Thus, an effective sealing of the housing interior relative to the external surroundings of the battery housing can be achieved. The same applies to the sealing of the coolant supply and discharge relative to the external surroundings of the battery. In addition, a sealing device formed in such a manner facilitates a simple mounting of the same on the battery housing. During the course of the mounting of the battery, the sealing devices can be preassembled on the battery housing. In this respect it is conceivable to provide a receiving groove on the battery housing, in which the sealing device is arranged prior to the fastening of the respective plate or cooling plate on the battery housing, so that it is partially received in the same.

According to an advantageous further development, the main portion has a rectangular shape with two narrow and two wide sides. In this further development, the sub-portions each have an annular, preferentially a circular geometry. Each of the two sub-portions can each be connected to a narrow or wide side of the rectangular main portion by means of a preferentially linear intermediate portion.

Particularly practically, the respective sealing device surrounds with the main portion a top side of the plate or cooling plate facing the battery housing along its outer edge. In this variant, the respective sealing device with the first sub-portion surrounds the path inlet of the plate or cooling plate and with a second sub-portion the path outlet of the plate or cooling plate.

Practically, the sealing devices can each be formed in the manner of a sealing ring, preferably with a round, particularly preferably with a circular profile. Such sealing devices can be produced particularly easily and thus cost-effectively in the production.

According to another preferred embodiment, the coolant paths present in the plate or cooling plate are formed by a hollow space formed in the respective plate or cooling plate with a channel-like geometry. This allows an effective coupling of the coolant to the respective battery cell module so that during the operation of the battery waste heat generated by the respective battery cell module can be effectively transferred to the coolant.

According to a further advantageous further development, a thermal adapter layer is arranged between at least one, preferentially each battery cell module and the plate or cooling plate assigned to this battery cell module. The adapter layer can be formed in particular through a heat-conducting paste or through a heat-conducting pad. In this way, the thermal coupling between the coolant flowing through the plate or cooling plate and the battery cell module can be improved.

According to a further advantageous further development, the battery housing with an underside comprising the housing cut-outs is arranged on a frame-like crash structure, preferentially of metal. In this way, the mechanical strength of the entire battery relative to external mechanical influences such as impacts or shocks, in particular when the battery is employed in a motor vehicle, is improved. Undesirable impact or shock-related damage to the battery can thus be counteracted.

According to another advantageous further development, the coolant supply and discharge can comprise multiple mechanical stiffening elements. In this way, the mechanical strength of the electric battery can be further improved and damage through mechanical shocks, impacts and the like, counteracted.

Further, the invention relates to a motor vehicle, in particular to an electrical vehicle having a purely electric drive. The motor vehicle includes a body and an electric battery according to the invention introduced above. The advantages of the battery according to the invention explained above therefore apply also to the motor vehicle according to the invention. Preferably, the battery includes the crash structure explained above. In this case, the battery is connected via the crash structure to the body of the motor vehicle.

Further important features and advantages of the invention are obtained from the subclaims, from the drawings and from the associated figure description by way of the drawings.

It is to be understood that the features mentioned above and still to be explained in the following cannot only be used in the respective combination stated, but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference numbers relate to same or similar or functionally same components.

It shows, in each case schematically.

DETAILED DESCRIPTION

Figure 1A:
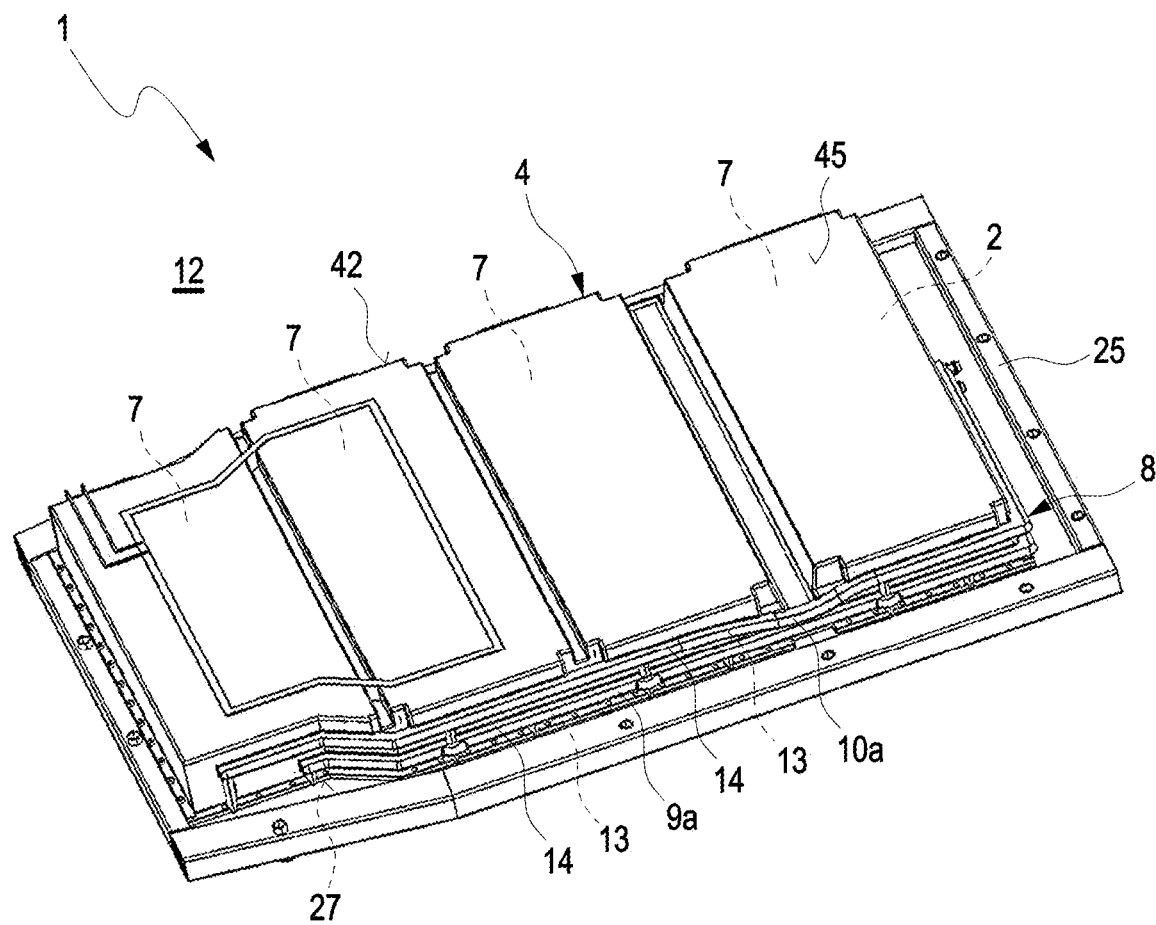
FIG. 1a, 1b an example of an electric battery in a perspective representation, FIG. 2 in different representations, FIG. 2 a first sectional view of the battery of FIG. 1, FIG. 3 a sectional view of the battery of FIG. 1 distinct from the first sectional view, FIG. 4 a plan view of one of the cooling plates, FIG. 5 a single battery cell module in a plan view, FIG. 6 the battery in further sectional view in which the electrical current conduction is shown, FIG. 7 the cover of the electrical current conduction shown in FIG. 6 in a separate and enlarged representation.
Figure 1B:
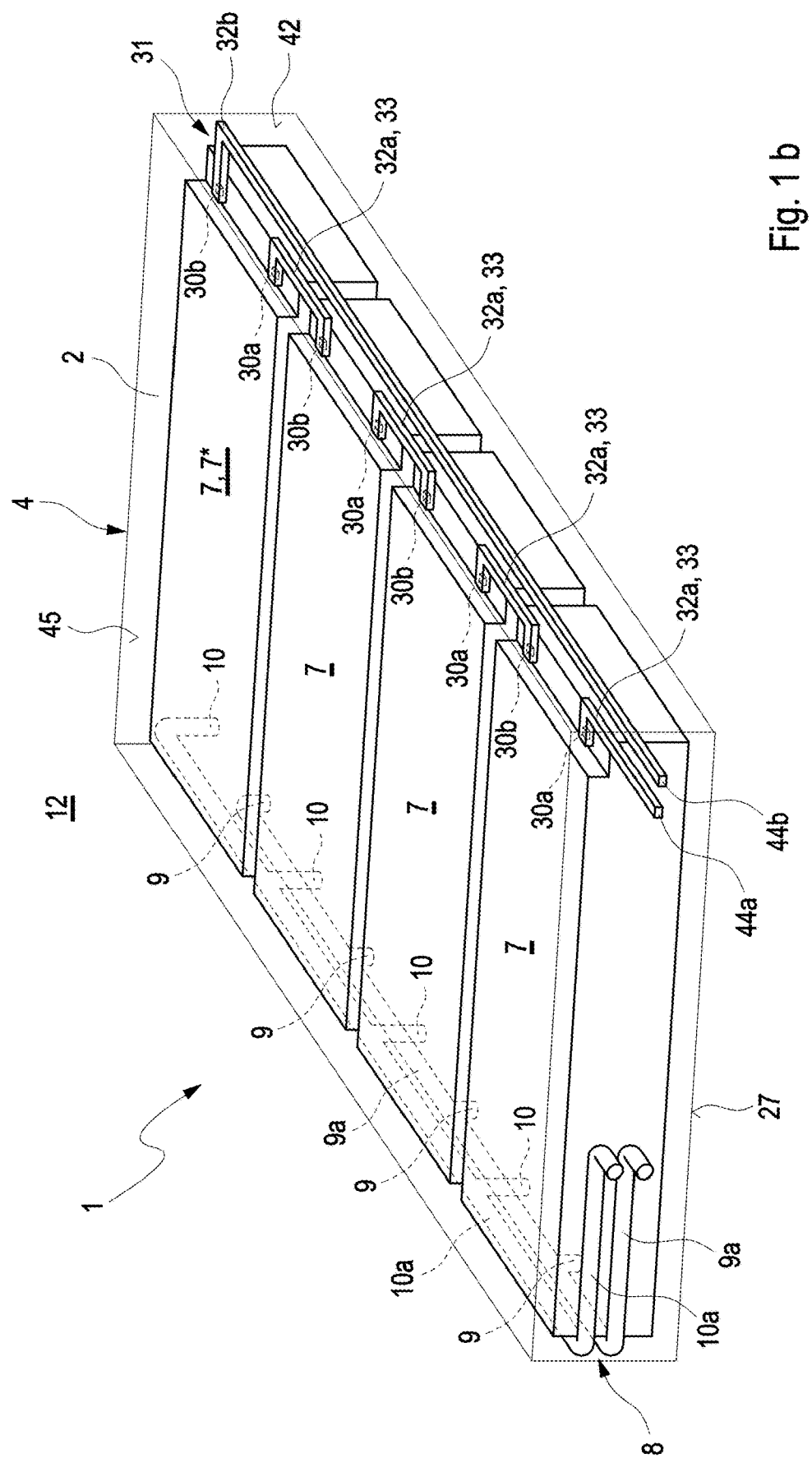

The FIGS. 1a and 1b illustrate an example of an electric battery 1 in two different perspective representations, the FIG. 2 in a sectional representation. The battery 1 includes a battery housing 4 of an electrically insulating plastic which partially surrounds a housing interior 2 and on its underside 27 comprises multiple housing cut-outs 3 that are spaced apart from one another. Each of the housing cut-outs 3 is sealed by means of a plate formed as cooling plate 5, in which a coolant path 6 that can be flowed through by a coolant is formed. Further, the battery 1 includes multiple battery cell modules 7 arranged in the housing interior 2 for storing electric energy, wherein each battery cell module 7 is arranged on one of the cooling plates 5 and is thermally connected to this cooling plate 5. Each battery cell module 7 can be introduced into the housing interior 2 via a certain one of the housing cut-outs 3.

According to FIG. 1a, the battery housing 4 can be arranged with an underside 27 comprising the housing cut-outs 3 on a frame-like crash structure 25 (not shown in FIG. 1b) preferentially of metal. The mechanical connection of the battery cell 1 to a motor vehicle can take place by means of the crash structure 25.

As is noticeable from the FIGS. 1a, 1b and 2, a coolant supply and discharge 8 is provided outside on the battery housing 4, which fluidically communicates with the coolant paths 6 of the cooling plates 5, so that by way of the coolant supply and discharge 8 the coolant can be introduced into the coolant paths 6 and, having flowed through the coolant paths 6, be again discharged from the cooling plates 5.

Figure 4:
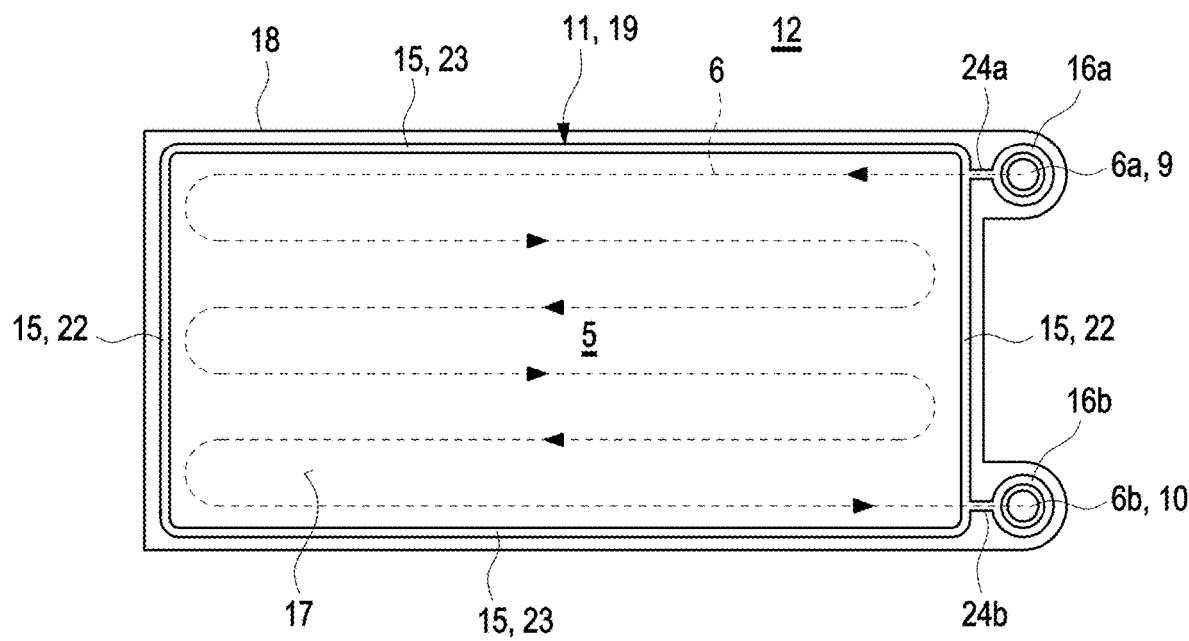

FIG. 3 shows a further sectional representation of the battery cell 1 in a section running perpendicularly to that of FIG. 2. FIG. 4 shows a plan view of a top side 17 of an individual cooling plate 5 facing the battery housing 4.

As is clearly indicated by FIG. 3, a thermal adapter layer 21 can be arranged between each battery cell module 7 and the cooling plate 5 assigned to this battery cell module 7, in order to improve in this way the thermal coupling of the battery cell module 7 to the cooling plate 5. The adapter layer 21 can be formed for example through a heat-conducting paste or a heat-conducting pad of a material with a high heat conductivity.

As is noticeable in the FIGS. 3 and 4, the coolant paths 6 present in the cooling plates 5 can be formed by a hollow space 20 formed in the respective channel plate 5 with a channel-like geometry and extend from a path inlet 6a to a path outlet 6b. The coolant supply and discharge 8 includes for each cooling plate 5 a coolant supply channel 9 fluidically communicating with the respective path inlet 6a and a coolant discharge channel 10 fluidically communicating with the path outlet 6b. All coolant supply channels 9 communicate fluidically with a common coolant distributor channel 9a of the coolant supply and discharge 8. All coolant discharge channels 10 communicate fluidically with a common coolant collector channel 10a of the coolant supply and discharge 8. The coolant distributor channel 9a serves for supplying the coolant into the coolant paths 6 formed in the cooling plates 5. The coolant collector channel 10a serves for collecting the coolant having flowed through the coolant paths 6. The coolant supply channels 9 and the coolant discharge channels 10 as well as the common coolant distributor channel 9a and the common coolant collector channel 10a can each be formed at least partially by at least one recess 13 formed outside on the battery housing 4, which is sealed in a fluid-type manner by means of a cover 14 preferentially formed in the manner of a tubular body and fastened to the battery housing 4.

It is further evident from the FIGS. 3 and 4 that for each cooling plate 5 present a sealing device 11 is provided. The sealing device 11 is arranged between the cooling plate 5 and the battery housing 4 so that it seals both the housing interior 2 as well as the coolant supply channel 9 and the coolant discharge channel 10, in each case in the region of the transition 28 to the coolant path 6, against the external surroundings 12 of the battery housing 4.

As is noticeable in particular from the representation of FIG. 4, the sealing device 11 is preferably formed in one piece. The sealing device 11 can be formed by a sealing ring 19, preferentially with a round, particularly preferably with a circular profile.

According to the FIGS. 3 and 4, the sealing device 11 can be arranged with a main portion 15 between the cooling plate 5 and the battery housing 4 and with two sub-portions 16a, 16b at the transition 28 between the cooling plate 5 and the coolant supply and discharge 8. In this way, the simultaneous sealing that is substantial for the invention is achieved on each cooling plate 5 both of the housing interior 2 and also of the respective coolant supply channel 9 and coolant discharge channel 10 against the external surroundings 12 by means of a single sealing device 11.

As is illustrated by the plan view of FIG. 4 of the top side 17 of the cooling plate 5, the sealing device 11 with its main portion 15 surrounds the top side 17 of the cooling plate 5 facing the battery housing 4 along its outer edge 18. In the example of FIG. 4, the main portion 15 in the shown plan view has a rectangular shape with rounded corners and with two narrow and two wide sides 22, 23, whereas the two sub-portions 16a, 16b each have a round, preferentially circular geometry.

According to FIG. 4, the two sub-portions 16a, 16b in the shown plan view are arranged spaced apart from one another and both are each connected by means of a linear intermediate portion 24a, 24b with one of the two narrow sides 22 of the rectangular main portion 15. Here, the first sub-portion 16a surrounds the path inlets 6a of the cooling plate 5 and the second sub-portion 16b the path outlet 6b of the cooling plate 5.

As is noticeable from FIG. 1b, each battery cell module 7 additionally includes an electrical positive connection 30a and an electrical negative connection 30b. Further, the battery 1 comprises an electrical current conduction 31 for supplying the battery cell modules 7 arranged in the housing interior 2 with electric energy. The electric current conduction 31 again includes a first electrical conductor rail 32a and a second electrical conductor rail 32b, each of an electrically conductive material.

As is illustrated by FIG. 1b and FIG. 2, the first conductor rail 32a is arranged partially and the second conductor rail 32b completely outside on the battery housing 4. The electrical conduction 31 with the two conductor rails 32a, 32b can be practically arranged on a side 42 of the battery housing 4 located opposite the coolant supply and discharge 8. On the electrical current conduction 31, a mechanical stiffening structure with multiple, preferentially rib-like stiffening elements (not shown) can be optionally formed.

The first conductor rail 32a includes multiple separate rail elements 33 by means of which a positive connection 30a and a negative connection 30b each of two adjacent battery cell modules 7 in the housing interior 2 are electrically connected to one another. In this way, the individual battery cell modules 7 can be electrically connected in series with one another. For realising such an electrical series connection, the second electrical conductor rail 32b is electrically connected to the negative connection 30b of one of the battery cell modules 7, which for illustration in FIG. 1b is additionally marked with the reference number 7*. The second electrical conductor rail 32b thus assumes the function of an electrical earth line. The two electrical conductor rails 32a, 32b can be connected to a respective connection portion 44a and 44b respectively with an electrical consumer (not shown) and/or with an electrical energy source (not shown).

Figure 5:
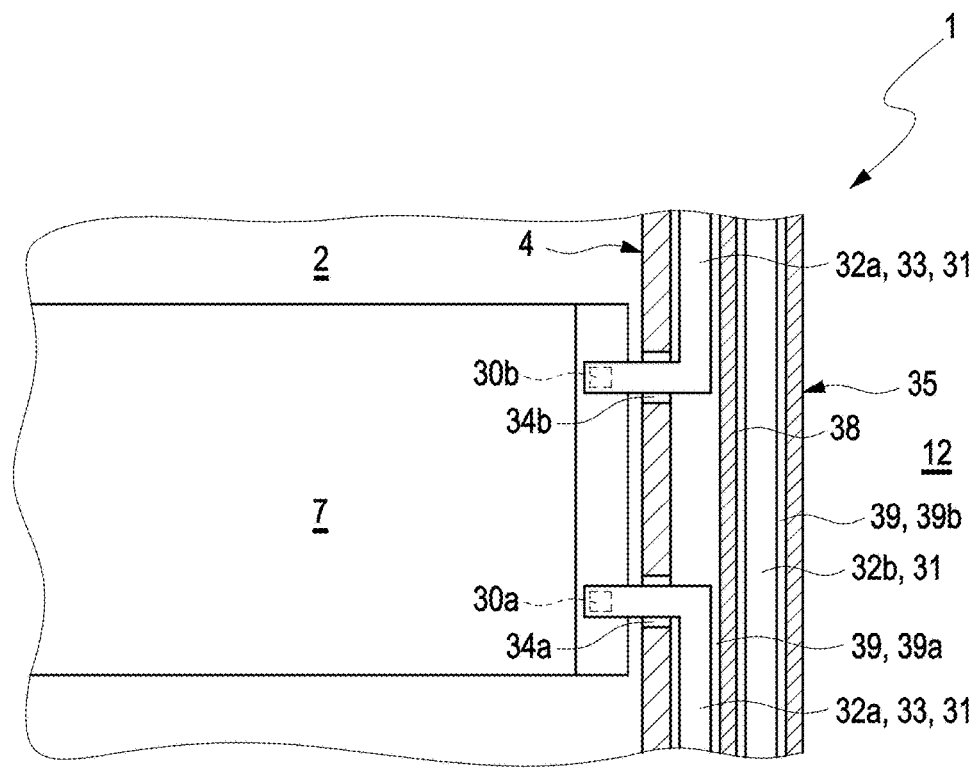

FIG. 5 shown an individual battery cell 7 in a plan view of the battery housing, wherein a top side 45 of the battery housing 4 is not shown, so that the housing interior 4 with the battery cell module 7 is noticeable.

The FIGS. 1b and 5 illustrate that for each battery cell module 7 in the battery housing 4 a first and a second cut-out 34a, 34b are formed, through which in each case a rail element 33 of the first conductor rail 32a electrically connecting the two adjacent battery cell modules 7 is passed. Such a rail element 33 with preferentially U-shaped geometry connects, as already explained, the electrical positive connection 30a of a defined battery cell module 7 with the electrical negative connection 30b of the adjacent battery cell module 7, so that the already mentioned electrical series connection of the battery cell modules 7 is realised. Each rail element 33 is partially arranged in the housing interior 2 and partially outside the battery housing 4.

Figures 6, 7:
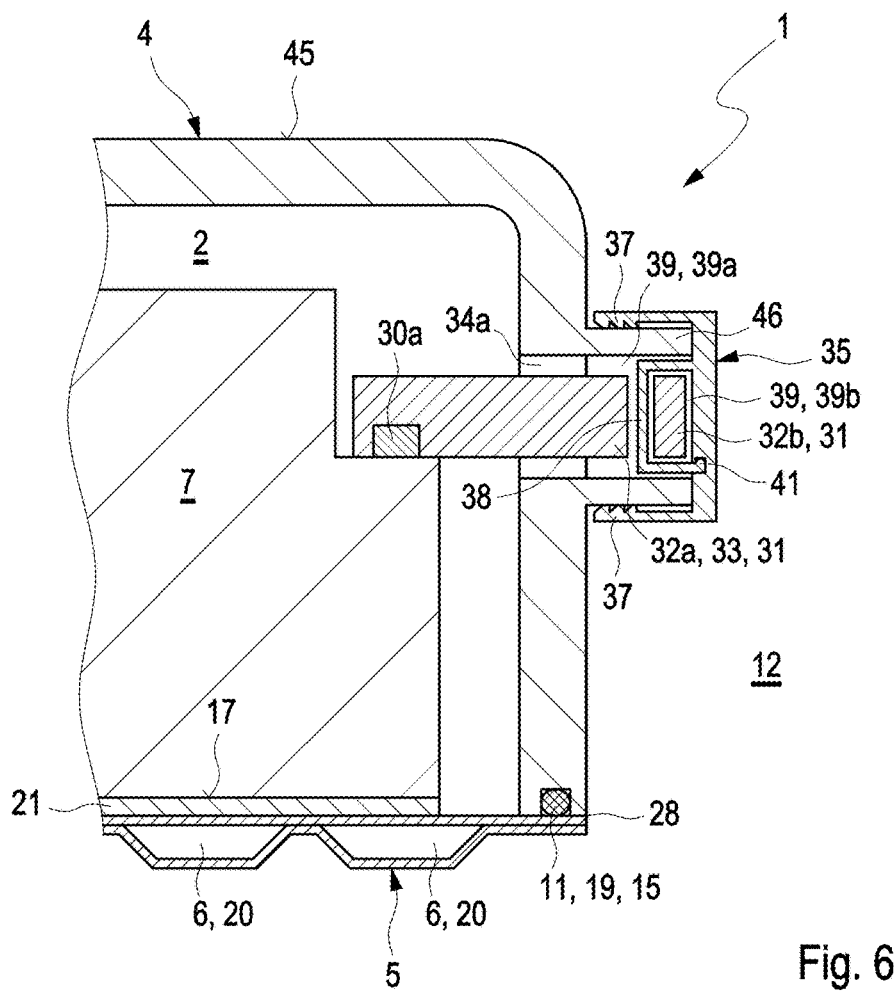

FIG. 6 shows the battery 1 in a further sectional view. The FIGS. 5 and 6 illustrate that the battery 1 includes a cover 35 of an electrically insulating plastic that is longitudinal in shape and preferably formed as a profile part that can be fastened to the battery housing 4, which in a state fastened to the battery housing 4 covers the two conductor rails 32a, 32b—and thus also all first and second cut-outs 34a and 34b respectively. In this way it is prevented that the electrical conductor rails 32a, 32b carrying an electric current during the operation of the battery 1 are exposed outside the battery housing 4. The cover 35 is preferably an extruded part of plastic or a plastic injection moulded part.

FIG. 7 shows the cover 35 in profile and in a separate enlarged representation. According to the FIGS. 6 and 7, the cover 35 is formed U-shaped in the profile and comprises a U-base 36c and a first and a second U-leg 36a, 36b which on the end side project at an angle, preferably at a right angle from the U-base 36c.

From the FIGS. 6 and 7 it is evident that on the two U-legs 36a, 36b a clamping structure 37 each for fixing the cover 35 on the battery housing 4 can be formed. On the cover 35, in particular on the U-base 36c, a separating element 38 of an electrically insulating plastic can be additionally moulded, which subdivides an interior space 39 delimited by the cover 35 and the battery housing 5 into a first compartment 39a, in which the first conductor rail 32a can be received, and into a second compartment 39b, in which the second conductor rail 30b can be received.

According to the FIGS. 6 and 7, the separating element 38 can include a first element portion 38a which, by means of a film hinge 40, is hinged to a second element portion 38b of the separating element 38. Here, the first element portion 38a is firmly connected to the U-base 36c and in particular integrally moulded on the same. The second element portion 38b is practically detachably fastened to the second element portion 38b by means of a clip-on connection or snap-on connection 41. According to FIG. 6, the separating element 38 and the U-base 36c together surround in the mounted state of the conductor rails 32a, 32b and the cover 35 on the battery housing 4 the second compartment 39b.

The assembly of the electric battery 1 can take place as follows:

Initially, the first conductor rail 32a with the rail elements 33 can be preassembled on the battery housing 4, so that the rail elements 33 after such a preassembly engage through the first and second cut-outs 34a,34b to the inside, into the housing interior 2. After this, the individual battery cell modules 7 can be introduced via the respective housing cut-out 3 into the housing interior 2 and fixed to the battery housing 4 there. The fastening of the battery cell modules 7 to the battery housing 4 can take place for example with the help of suitable screw connections (not shown). During the course of the arranging of the battery cell modules 7 in the housing interior 2, the respective electrical positive connections 30a and electrical negative connections 30b of the battery cell modules 7 are then electrically and mechanically connected to one another for example with the help of plug connections (not shown).

Following this, the already mentioned thermal adapter layer 21—for example as a heat-conducting paste—can be optionally applied to the undersides of the battery cell modules 7 facing the housing cut-outs 3.

In a next mounting step, the second conductor rail 32b is mounted to the cover 35. To this end, the second conductor rail 32b is initially preassembled on the cover 35 and for this purpose arranged in the region of the separating element 38. Following this, the second element portion 38b is folded round about the second conductor rail 32b by means of the film hinge 40. By subsequently fixing the second element portion 38b of the separating element 38 on the U-base 36c of the cover 35 by means of the clip-on connection 41, the second conductor rail 32b is permanently fixed in the second compartment 39b of the interior 39 formed in this manner.

The unit of second conductor rail 32b and cover 35 formed in this manner is subsequently fastened with the help of the clamping structures 37 to a housing collar 46 (see FIG. 3) projecting from the battery housing 4 or directly to the battery housing 4—in the case that no housing collar 46 is provided. During the course of this fastening, the second conductor rail 32b can also be electrically and mechanically connected to the electrical negative connection 30b of the battery cell module 7\*—just like the rail elements 33 of the first conductor rail 32a—for example by means of a plug connection.

After this, both the first conductor rail 32a and also the second conductor rail 32b are covered as desired by means of the cover 35 and fixed on the battery housing 4.

The invention claimed is:

1. An electric battery, comprising:
a battery housing of an electrically insulating plastic, the battery housing partially surrounding a housing interior and including multiple housing cut-outs, each of the housing cut-outs is sealed via a corresponding cooling plate of a plurality of cooling plates, and the corresponding cooling plate includes a coolant path that can be flowed through by a coolant;
multiple battery cell modules arranged in the housing interior, the battery cell modules are configured for storing electric energy and each battery cell module is thermally connected to one of the plurality of cooling plates, and each of the battery cell modules includes an electrical positive connection and an electrical negative connection;
an electrical current conduction configured for supplying the battery cell modules with electric energy, the electrical current conduction includes a first electrical conductor rail and a second electrical conductor rail, and the first electrical conductor rail and the second electrical conductor rail each comprises an electrically conductive material and are both arranged at least partially outside on the battery housing;
wherein the first electrical conductor rail includes multiple rail elements, one of the electrical positive connections and one of the electrical negative connections of adjacent battery cell modules are electrically connected to one another via one of the rail elements, and wherein the second electrical conductor rail is electrically connected to the electrical negative connection of one of the battery cell modules;
wherein for each battery cell module at least one further cut-out is formed, and a rail element of the first conductor rail is passed through the at least one further cut-out; and
wherein a cover of an electrically insulating plastic that is formed separately from the battery housing and can be fastened to the battery housing is provided, the cover is configured to cover the first electrical conductor rail and the second electrical conductor rail outside the battery housing.

2. The battery according to claim 1, wherein the cover is formed U-shaped in profile with a U-base and two U-legs, wherein on the two U-legs, a clamping structure for fixing the cover to the battery housing is formed.

3. The battery according to claim 2, wherein on the U-base of the cover, a separating element of an electrically insulating plastic is moulded, the separating element is configured to subdivide the interior delimited by the cover and the battery housing into a first compartment and a second compartment, and the first conductor rail is received by the first compartment and the second conductor rail is received by the second compartment.

4. The battery according to claim 3, wherein the separating element includes a first element portion, the first element portion via a moveable film hinge, is hinged to a second element portion of the separating element, and wherein the first element portion is integrally moulded to the U-base, and the second element portion is detachably fixed to the U-base.

5. The battery according to claim 4, wherein the first element portion is fixed to the second element portion via a clip-on connection or snap-on connection.

6. The battery according to claim 3, wherein the separating element and the U-base are arranged to surround the second compartment.

7. The battery according to claim 1, further comprising a mechanical stiffening structure having multiple rib-like stiffening elements disposed on the electrical current conduction.

8. The battery according to claim 1, wherein the electrical current conduction is arranged on a side of the battery housing located opposite a coolant supply and discharge.

9. The battery according to claim 1, wherein the cover is an extruded part.

10. The battery according to claim 1, wherein the battery housing is arranged with an underside including the multiple housing cut-outs on a frame-like crash structure comprising metal.

11. A motor vehicle, comprising:
a purely electric drive, including:
a body, and
an electric battery, the electric battery including:
a battery housing of an electrically insulating plastic, the battery housing partially surrounding a housing interior and including multiple housing cut-outs, each of the housing cut-outs is sealed via a corresponding cooling plate of a plurality of cooling plates, and the corresponding cooling plate includes a coolant path that can be flowed through by a coolant;
multiple battery cell modules arranged in the housing interior, the battery cell modules are configured for storing electric energy and each battery cell module is thermally connected to one of the plurality of cooling plates, and each of the battery cell modules includes an electrical positive connection and an electrical negative connection;
a cover of an electrically insulating plastic that is formed separately from the battery housing and can be fastened to the battery housing;
an electrical current conduction configured for supplying the battery cell modules with electric energy, the electrical current conduction includes a first electrical conductor rail and a second electrical conductor rail, and the first electrical conductor rail and the second electrical conductor rail each comprises an electrically conductive material and are both arranged at least partially outside on the battery housing;
wherein the first electrical conductor rail includes multiple rail elements, one of the electrical positive connections and one of the electrical negative connections of adjacent battery cell modules are electrically connected to one another via one of the rail elements, and wherein the second electrical conductor rail is electrically connected to the electrical negative connection of one of the battery cell modules;
wherein for each battery cell module at least one further cut-out is formed, and a rail element of the first conductor rail is passed through the at least one further cut-out; and
wherein the cover is configured to cover the first electrical conductor rail and the second electrical conductor rail outside the battery housing;
wherein the electric battery is connected to the body via a frame-like crash structure.

12. The motor vehicle according to claim 11, wherein the battery housing is arranged with an underside comprising the housing cut-outs on the frame-like crash structure, and wherein the frame-like crash structure is metal.

13. The motor vehicle according to claim 11, wherein the cover is formed U-shaped in profile with a U-base and two U-legs, wherein on the two U-legs, a clamping structure for fixing the cover to the battery housing is formed.

14. The motor vehicle according to claim 13, wherein on the U-base of the cover, a separating element of an electrically insulating plastic is moulded, the separating element is configured to subdivide the interior delimited by the cover and the battery housing into a first compartment and a second compartment, and the first conductor rail is received by the first compartment and the second conductor rail is received by the second compartment.

15. The motor vehicle according to claim 14, wherein the separating element includes a first element portion, the first element portion via a moveable film hinge, is hinged to a second element portion of the separating element, and wherein the first element portion is integrally moulded to the U-base, and the second element portion is detachably fixed to the U-base.

16. An electric battery, comprising:
a battery housing including a plurality of housing cut-outs, each housing cut-out sealed via a corresponding cooling plate of a plurality of cooling plates;
a plurality of battery cell modules configured to store electric energy and each battery cell module thermally connected to one of the plurality of cooling plates, each of the battery cell modules includes an electrical positive connection and an electrical negative connection;
an electrical current conduction configured to supply the battery cell modules with electric energy, the electrical current conduction includes a first electrical conductor rail and a second electrical conductor rail; and
a cover detachably coupled to the battery housing;
wherein the first electrical conductor rail includes a plurality of rail elements, and wherein one of the rail elements is configured to electrically connect adjacent battery cell modules;
wherein the cover is formed U-shaped in profile with a U-base and two U-legs, wherein on the two U-legs, a clamping structure for fixing the cover to the battery housing is formed;
wherein on the U-base of the cover, a separating element of an electrically insulating plastic is moulded, the separating element is configured to subdivide an interior delimited by the cover and the battery housing into a first compartment and a second compartment, and the first electrical conductor rail is received by the first compartment and the second electrical conductor rail is received by the second compartment; and
wherein the separating element includes a first element portion, the first element portion, via a moveable film hinge, is hinged to a second element portion of the separating element, and wherein the first element portion is integrally moulded to the U-base, and the second element portion is detachably fixed to the U-base.

17. The battery according to claim 16, wherein the first element portion is fixed to the second element portion via a clip-on connection or snap-on connection.

18. The battery according to claim 16, wherein the separating element and the U-base together surround the second compartment.

19. The battery according to claim 16, further comprising a mechanical stiffening structure having multiple rib-like stiffening elements disposed on the electrical current conduction.

20. The battery according to claim 16, wherein the electrical current conduction is arranged on a side of the battery housing located opposite a coolant supply and discharge.

* * * * *